Patented July 17, 1923.

1,462,236

UNITED STATES PATENT OFFICE.

RANNIE S. LLOYD, OF MAYSVILLE, NORTH CAROLINA.

COMPOSITION FOR VARNISH.

No Drawing.   Application filed July 19, 1922.  Serial No. 576,117.

*To all whom it may concern:*

Be it known that I, RANNIE S. LLOYD, a citizen of the United States, residing at Maysville, in the county of Jones and State of North Carolina, have invented certain new and useful Improvements in a Composition for Varnish, of which the following is a specification.

This invention relates to varnish, and more particularly to a method and process in preparing the same.

An object of this invention is to prepare a varnish that will be easily prepared and cheaply manufactured. In preparing this varnish I use the crude sap extracted from the long leaf pine, which is obtained by bleeding the tree in the general manner in which rosin and turpentine is obtained. A box is cut into the lower part of the tree, or a suitable receptacle can be placed thereon for catching the sap which flows in a semi-liquid form.

After a tree has given forth the sap which usually requires from two to three days, the contents of the receptacle above mentioned is distilled to obtain spirits of turpentine, the hard substance remaining after the spirits of turpentine is extracted is commercially known as rosin.

The spirits of turpentine is then placed in a cooking vessel, together with fresh crude sap extracted from the tree, and boiled to 300 degrees Fahrenheit, after which the process is completed and the product ready for use.

In this condition the varnish is not affected by atmospheric conditions but will remain a liquid indefinitely when hermetically sealed. If it is desired by the user to make a thin, light varnish the same may be accomplished by adding spirits of turpentine.

It will be understood, therefore, that this varnish is extracted from the long leaf pine, and after going through the process mentioned a pure varnish is produced without the use of other foreign substance. The proportions most preferable are distilled turpentine three parts and crude pine sap one part.

From the foregoing description it is believed that my process will be understood, however, I do not intend to limit myself to the exact proportions as mentioned.

Having thus described my invention, what I claim, and desire to secure by Letters Patent, is:

1. The process of preparing varnish which consists in mixing crude pine sap with spirits of turpentine.

2. The process of preparing varnish which consists in mixing crude pine sap with spirits of turpentine in substantially the proportions of one to three.

3. A varnish composition comprising a mixture of crude sap from the long leaf pine tree and spirits of turpentine.

4. A varnish composition comprising a mixture of crude sap from the long leaf pine tree and spirits of turpentine obtained from the long leaf pine.

5. A varnish composition comprising a mixture of crude long leaf pine sap and spirits of turpentine, in substantially the proportions of one to three.

6. The process of preparing varnish which consists in mixing crude pine sap with spirits of turpentine in substantially the proportions of one to three; and heating the mixture to substantially 300 degrees F.

In testimony whereof, I, affix my signature.

RANNIE S. LLOYD.